No. 817,862. PATENTED APR. 17, 1906.
S. P. MITCHELL.
DERRICK CAR.
APPLICATION FILED OCT. 28, 1904.
12 SHEETS—SHEET 1.
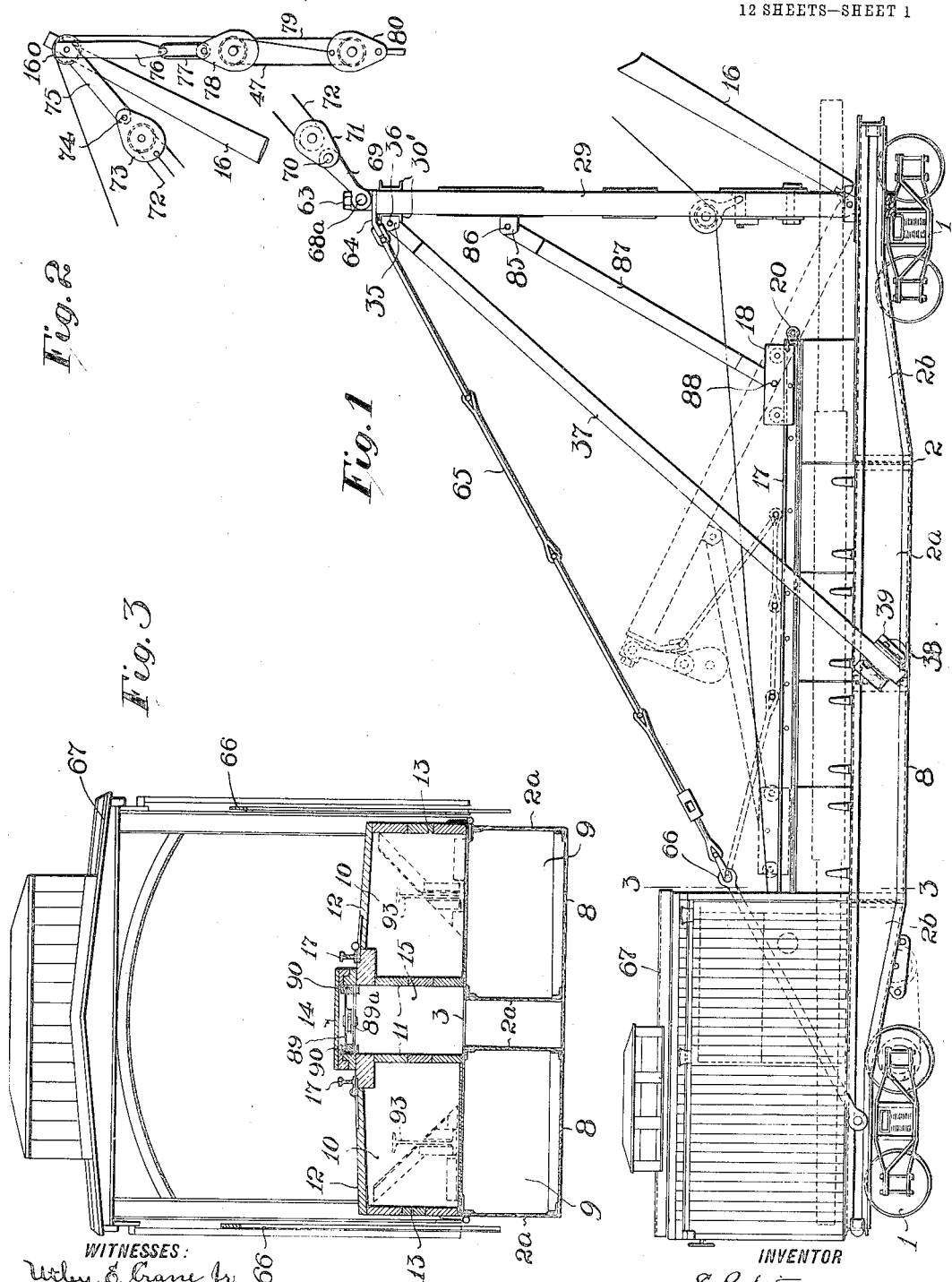
WITNESSES:
INVENTOR
ATTORNEY.

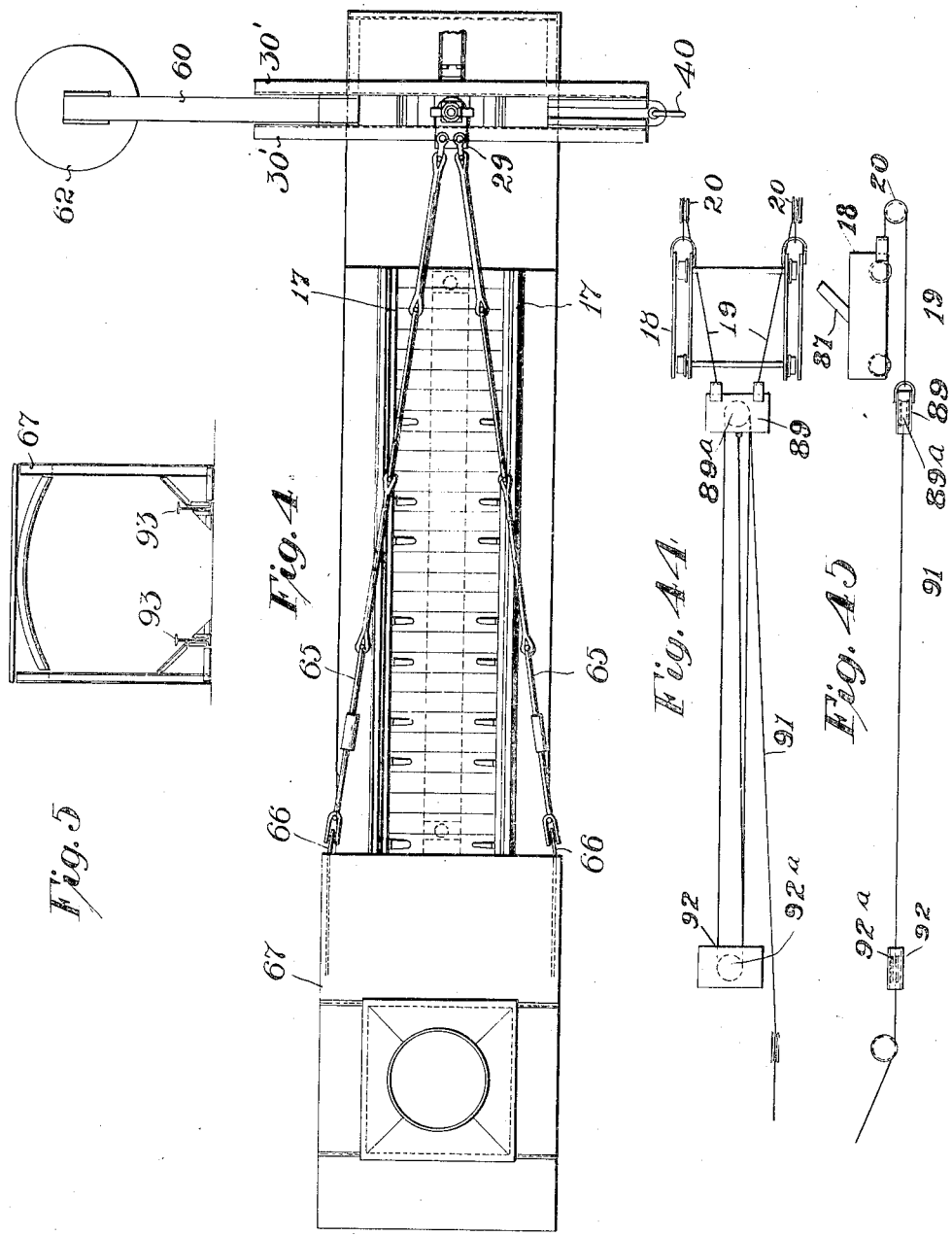

No. 817,862. PATENTED APR. 17, 1906.
S. P. MITCHELL.
DERRICK CAR.
APPLICATION FILED OCT. 28, 1904.
12 SHEETS—SHEET 3.
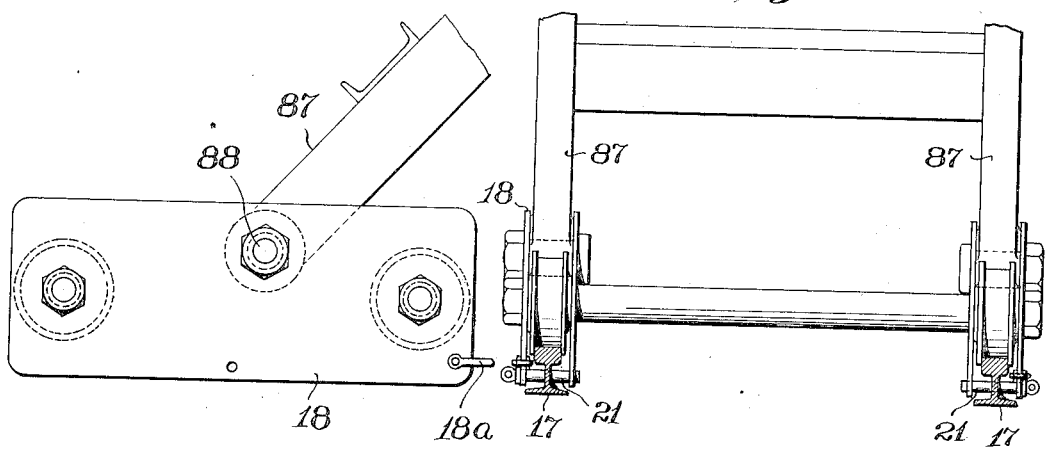
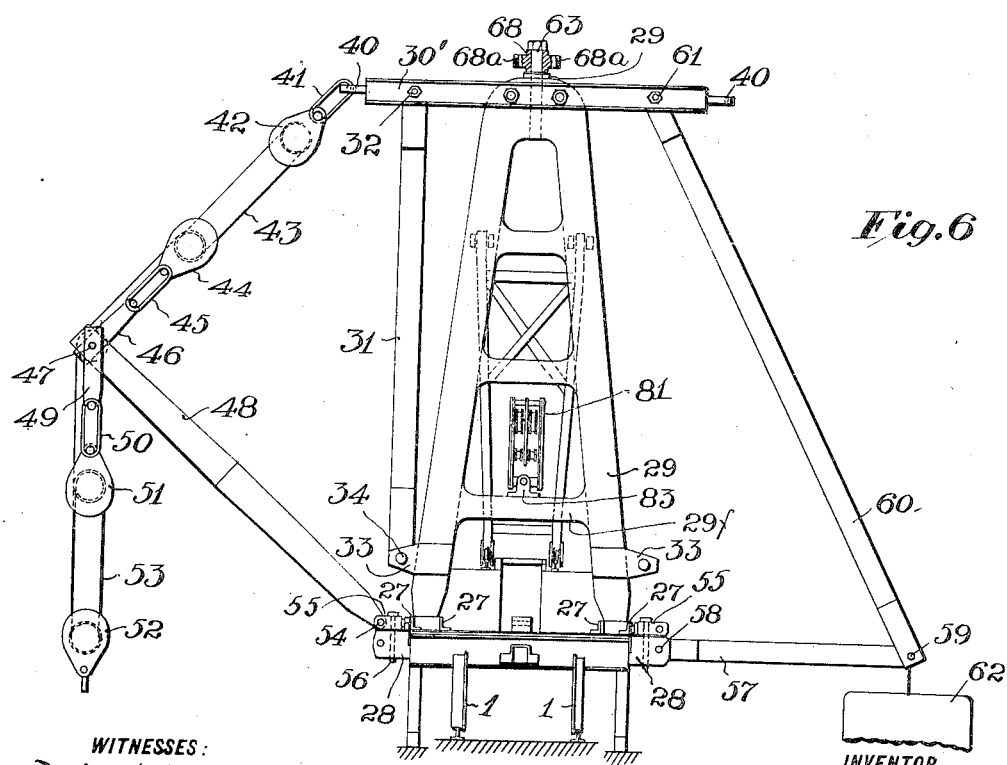

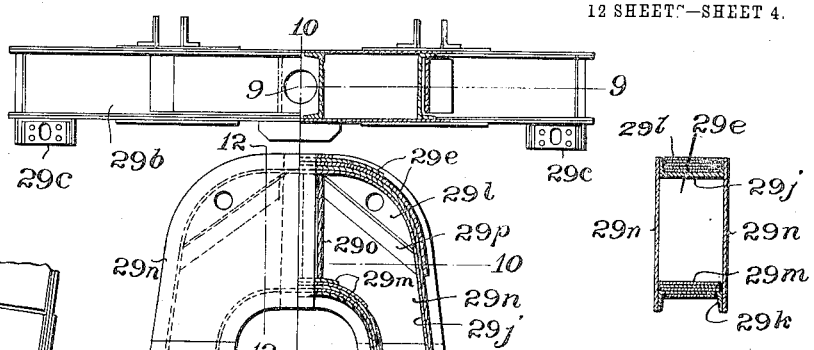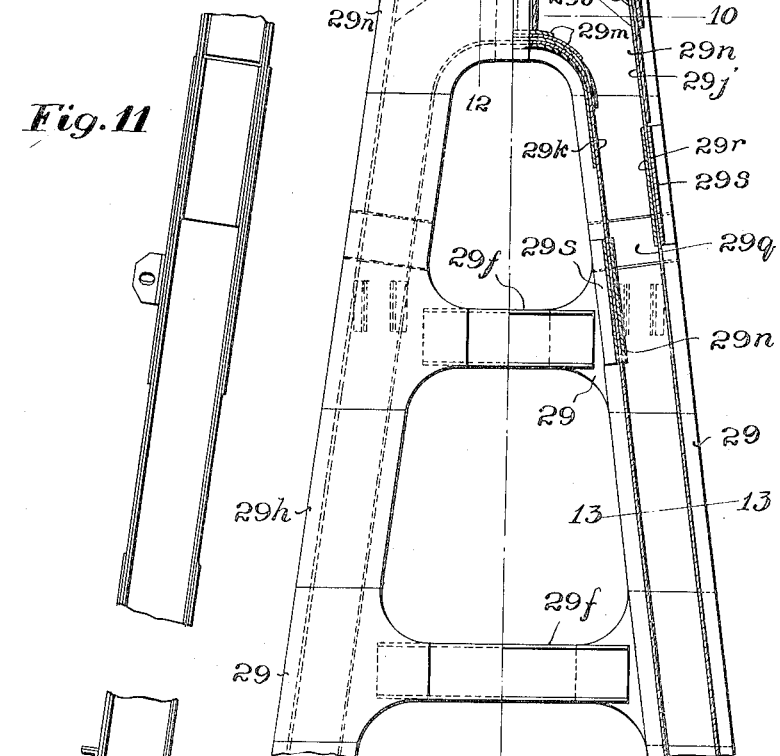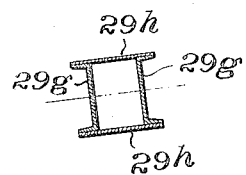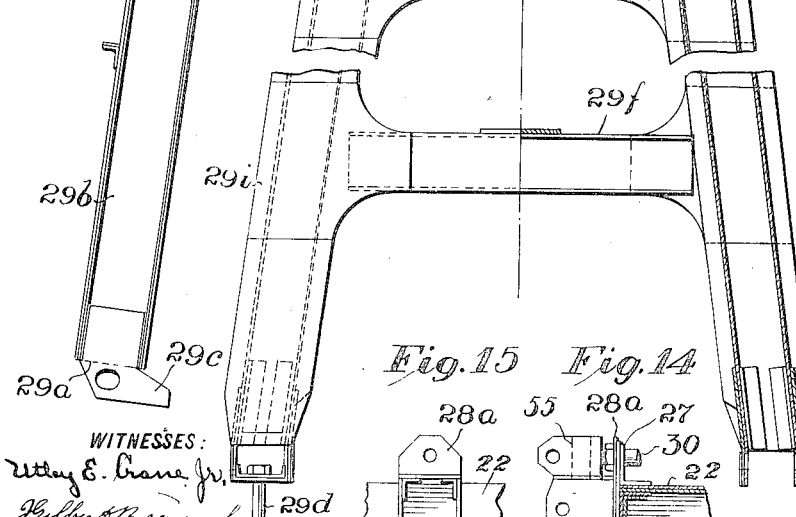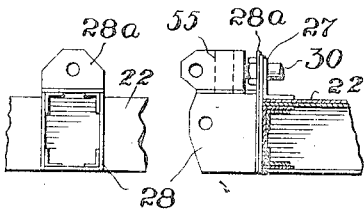

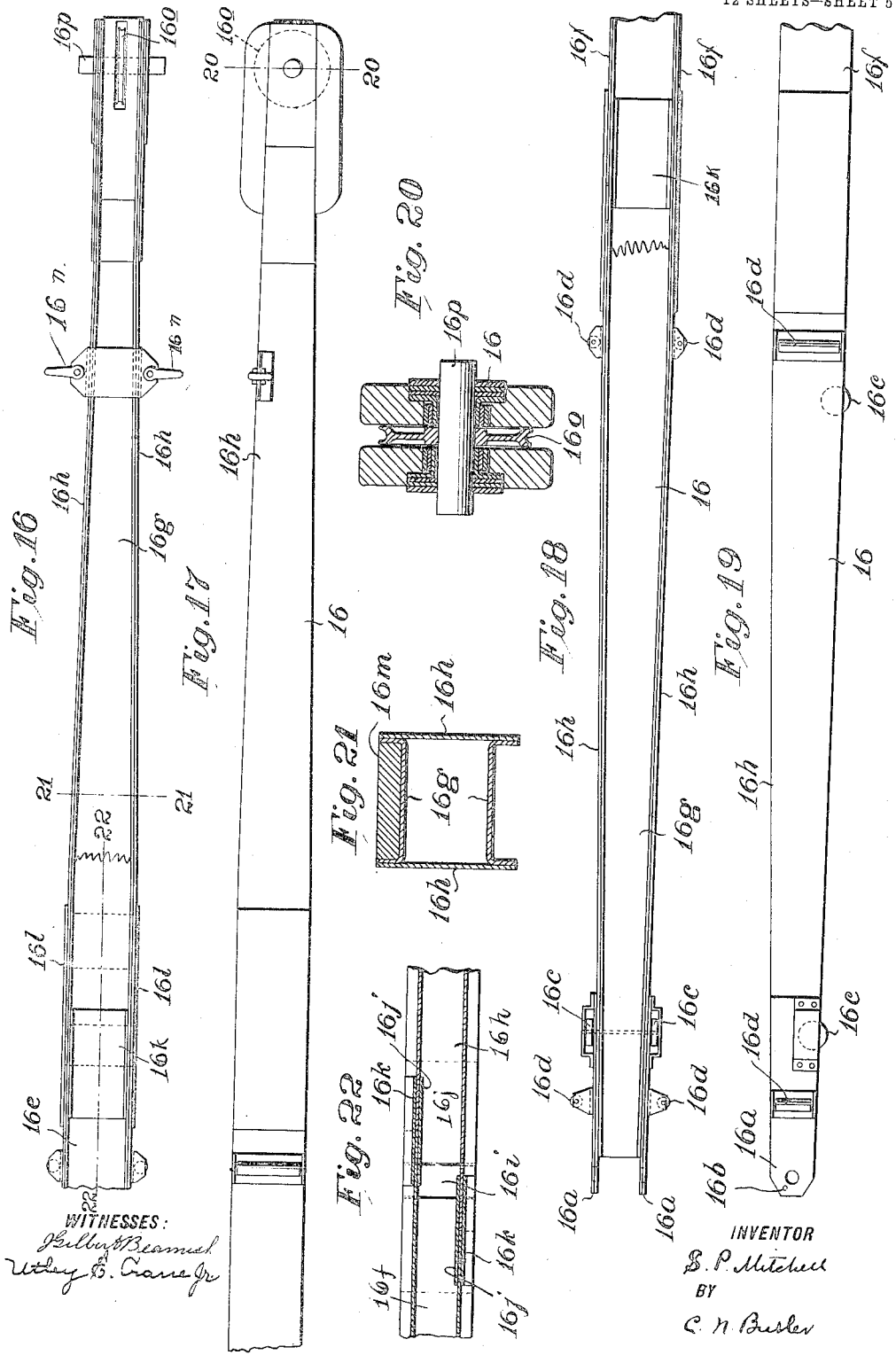

No. 817,862. PATENTED APR. 17, 1906.
S. P. MITCHELL.
DERRICK CAR.
APPLICATION FILED OCT. 28, 1904.
12 SHEETS—SHEET 6.
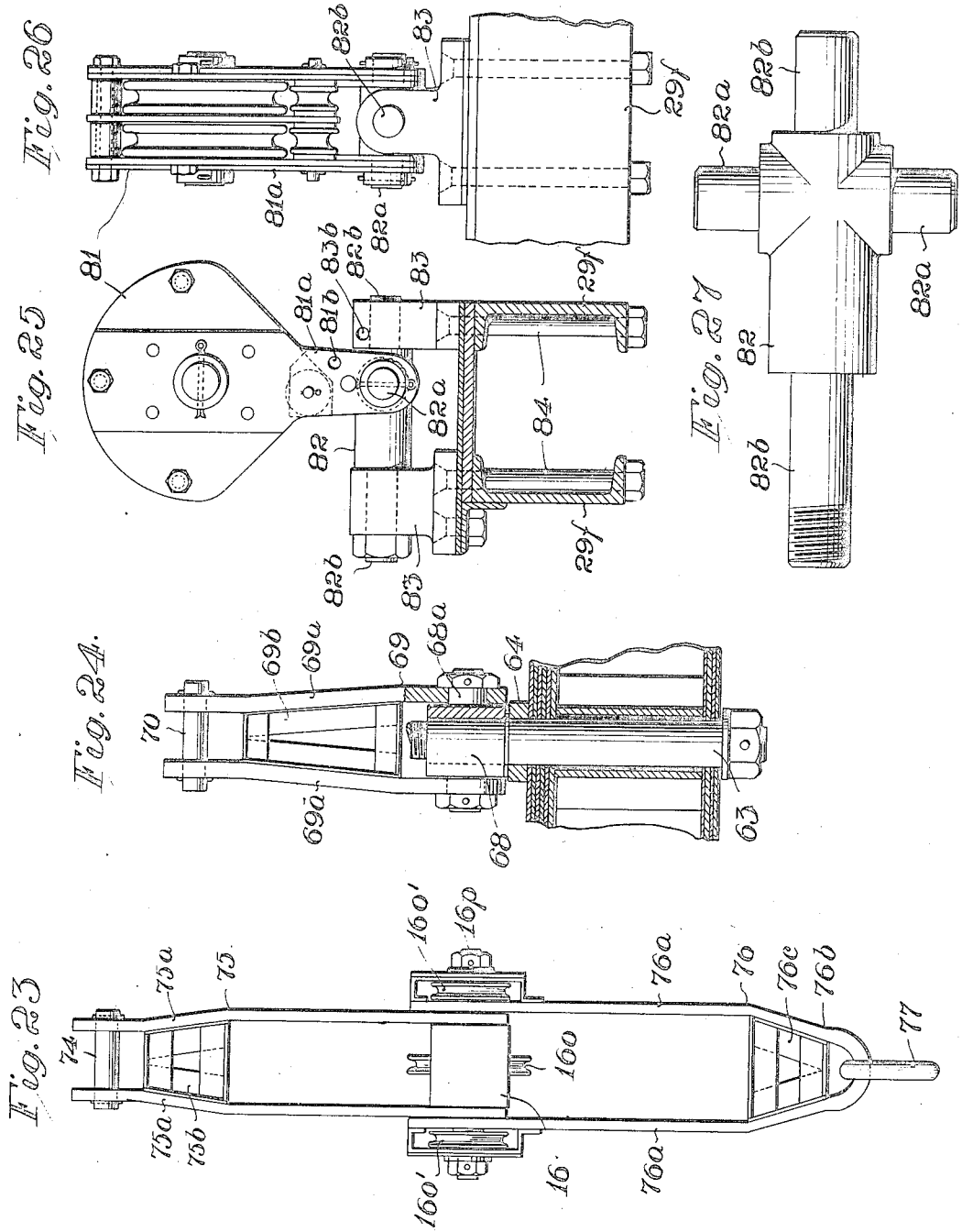
WITNESSES:
Utley E. Crane Jr.
Halbert Beamish
INVENTOR
S. P. Mitchell
BY
C. N. Butler
ATTORNEY.

No. 817,862.
PATENTED APR. 17, 1906.
S. P. MITCHELL.
DERRICK CAR.
APPLICATION FILED OCT. 28, 1904.
12 SHEETS—SHEET 7.
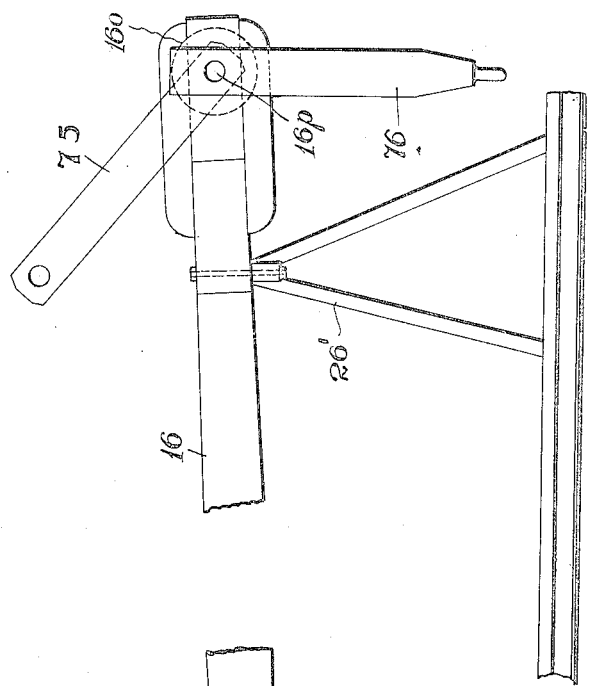
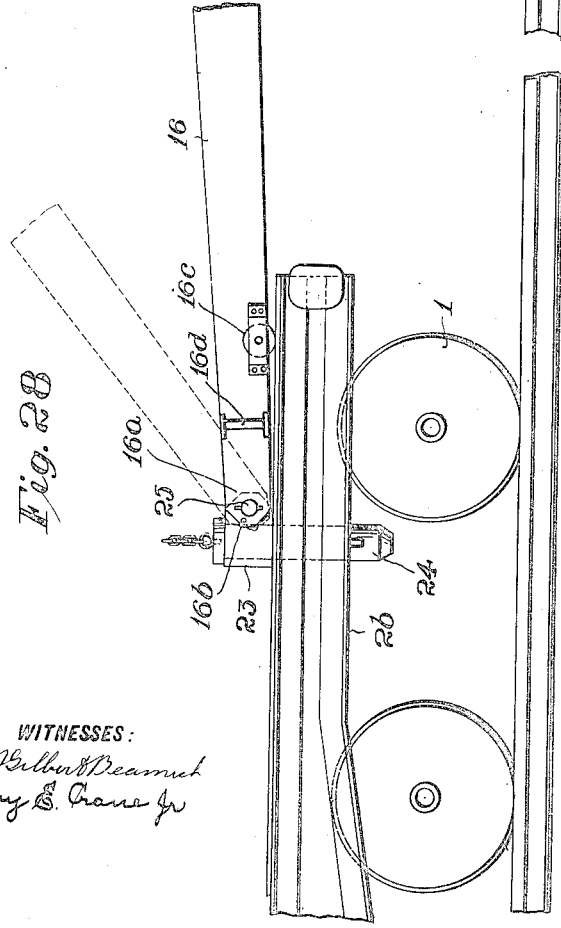
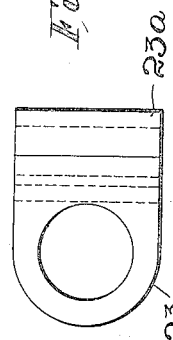
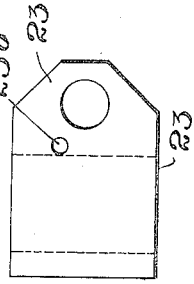
WITNESSES:
Gilbert Beaumont
Utley E. Crane Jr
INVENTOR
S. P. Mitchell
BY
C. N. Busher
ATTORNEY.

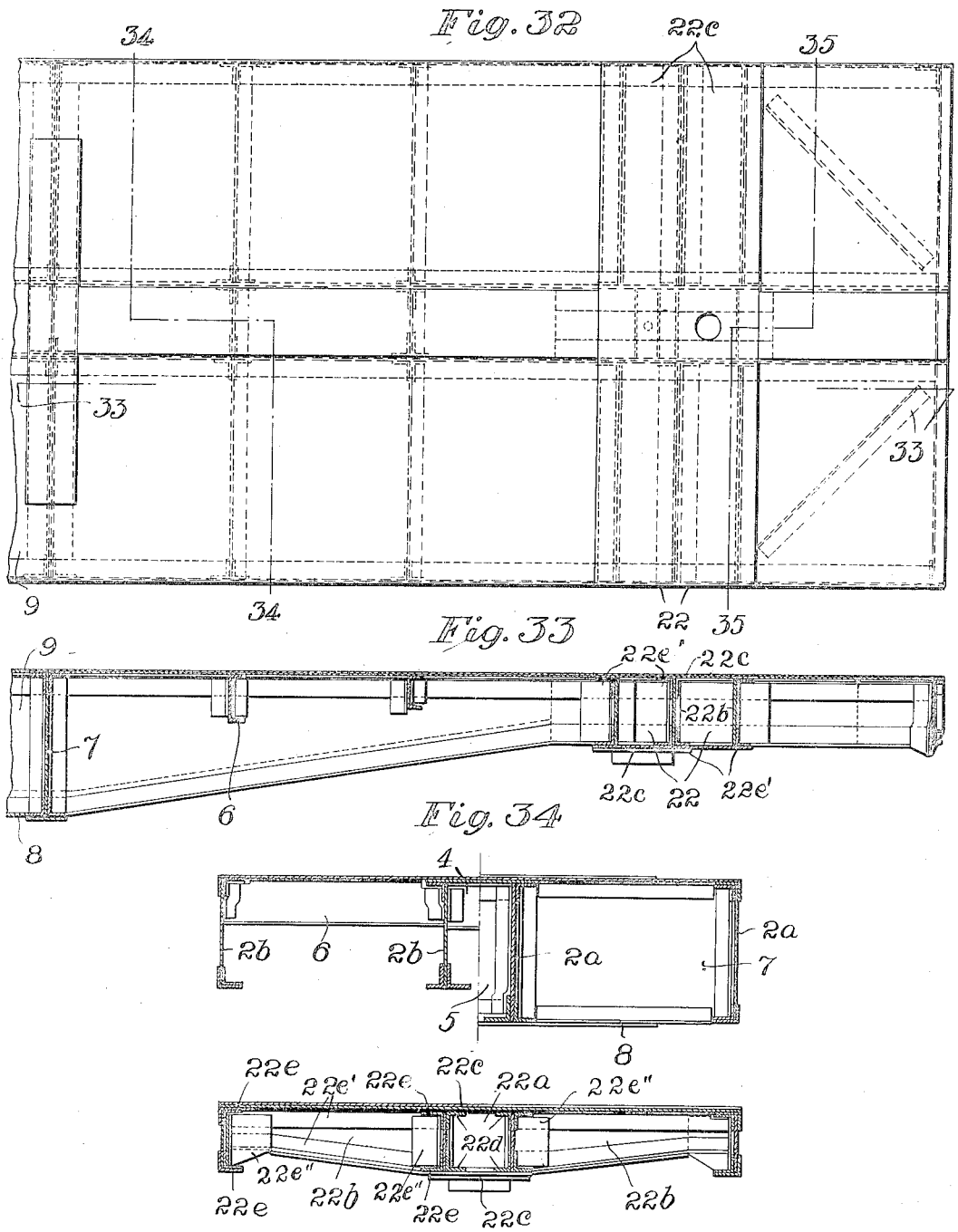

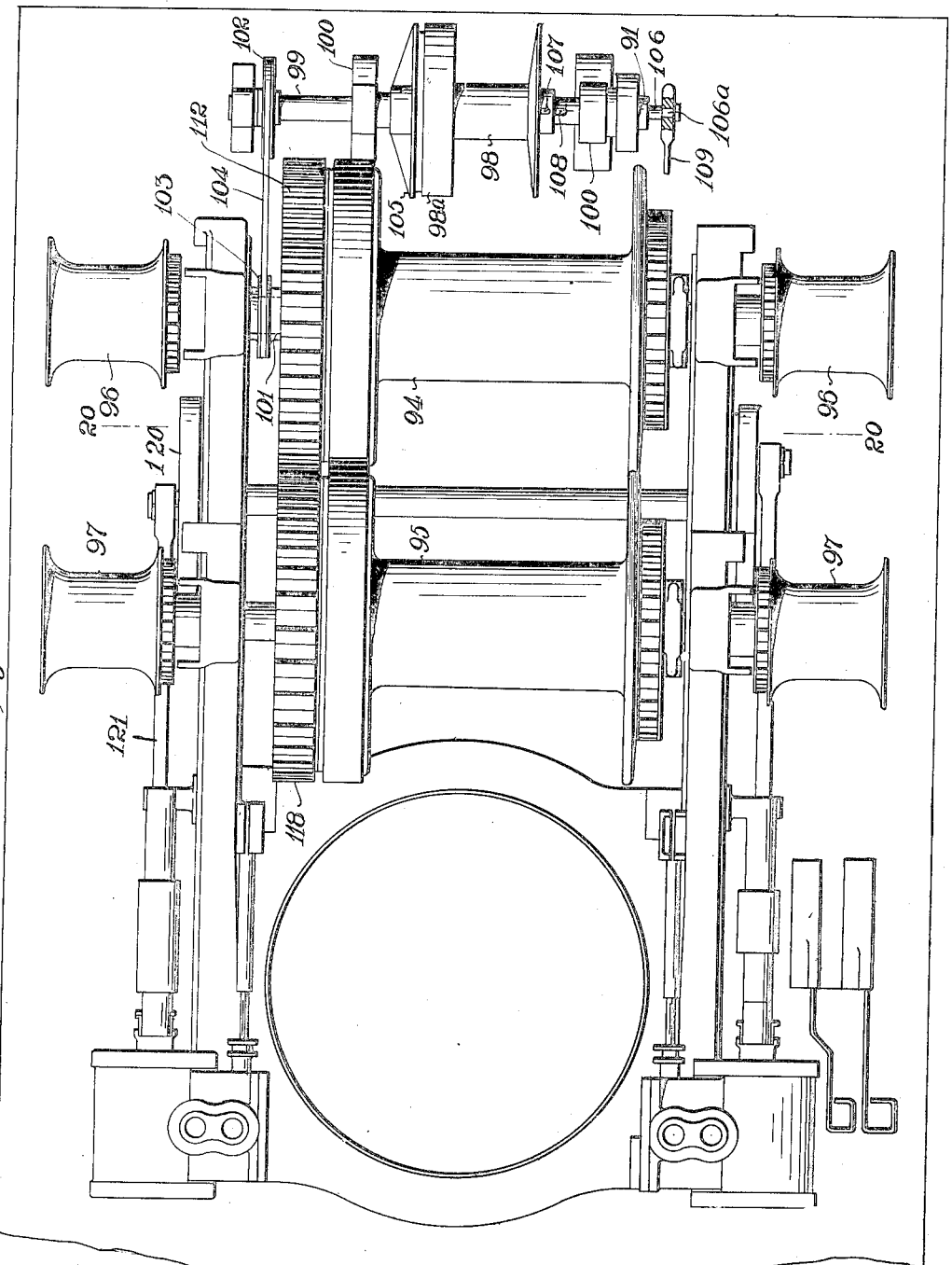

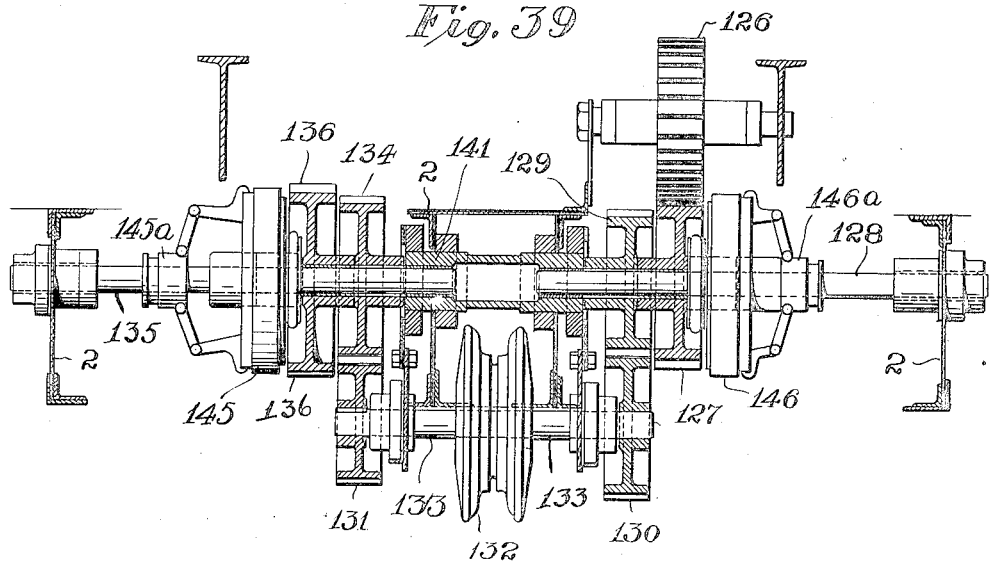

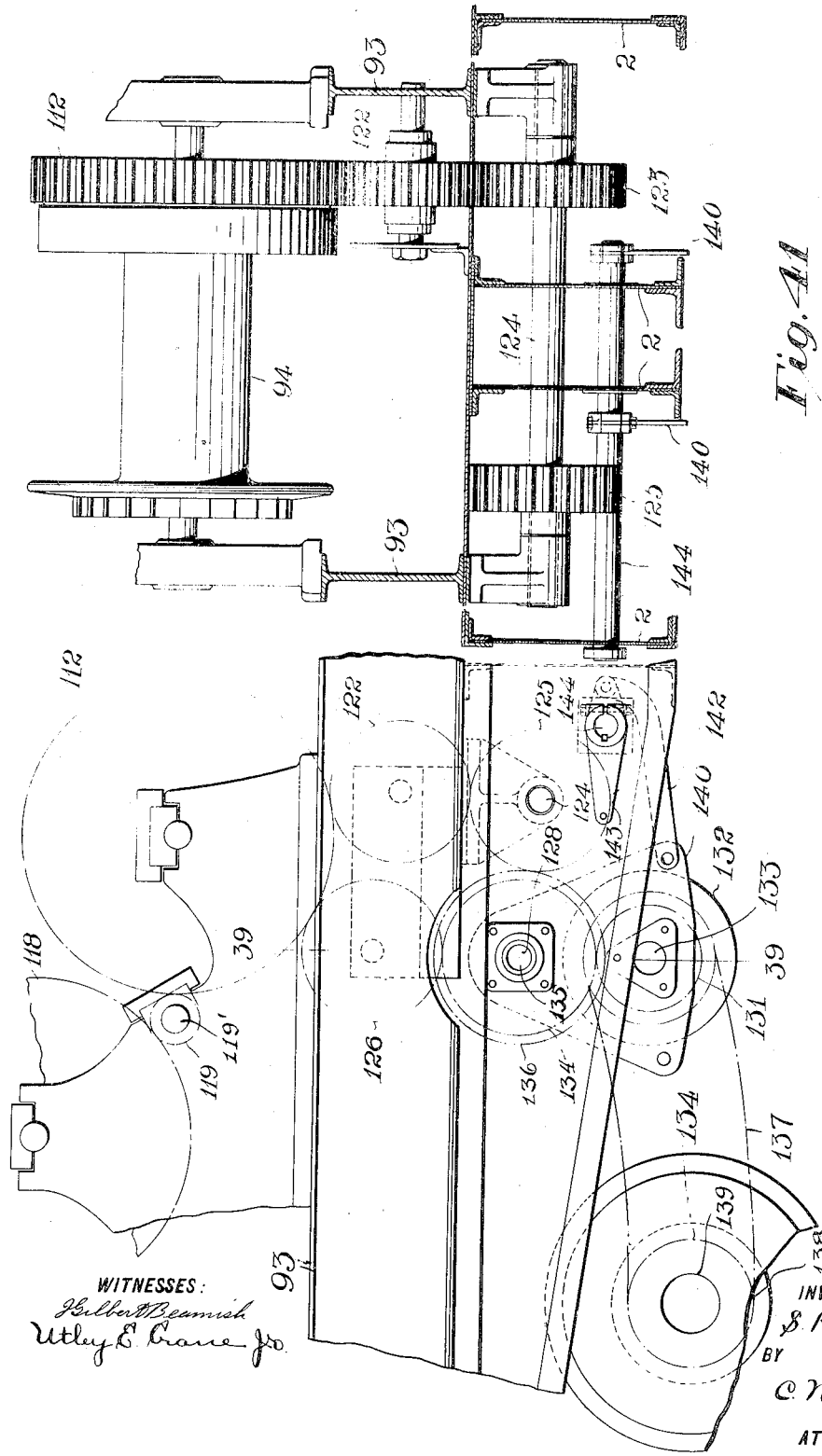

No. 817,862. PATENTED APR. 17, 1906.
S. P. MITCHELL.
DERRICK CAR.
APPLICATION FILED OCT. 28, 1904.
12 SHEETS—SHEET 12.
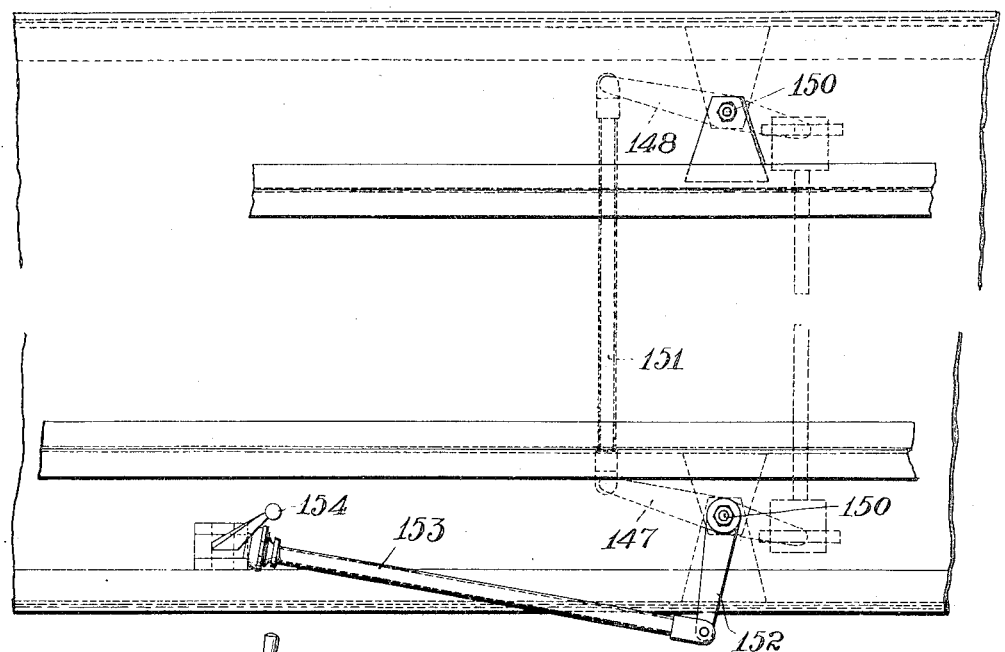
Fig. 42
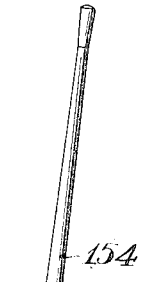
Fig. 43
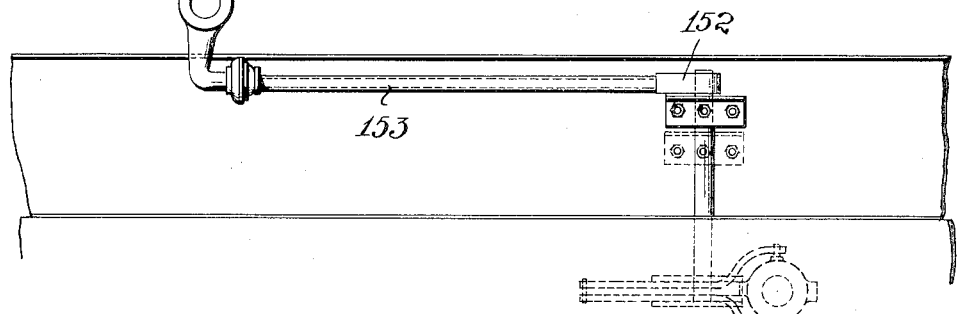
WITNESSES:
Gilbert Beaumont
Utley E. Crane Jr.
INVENTOR
S. P. Mitchell
BY
C. N. Butler
ATTORNEY.

UNITED STATES PATENT OFFICE

SAMUEL P. MITCHELL, OF PHILADELPHIA, PENNSYLVANIA.

DERRICK-CAR.

No. 817,862.     Specification of Letters Patent.     Patented April 17, 1906.

Application filed October 28, 1904. Serial No. 230,377.

*To all whom it may concern:*

Be it known that I, SAMUEL P. MITCHELL, a citizen of the United States, residing at Philadelphia, county of Philadelphia, and State of Pennsylvania, have invented certain Improvements in Derrick-Cars, of which the following is a specification.

This invention comprises a derrick of peculiar construction and extended capacity carried by a specially-designed car having mechanism adapted for operating both the derrick and the car.

The characteristic features comprise in general improved means for balancing and lifting very heavy loads, which can be picked up and moved from or to any position in front or on either side of the car, for readily manipulating the load by power wherever it may require to be picked up or moved to, for propelling the car and carrying the derrick with its load by the motor for operating the derrick, for quickly assembling or dissociating and stowing on the car the parts of the derrick, and for providing facility for stowing the tools of the operating crew.

Features of improvement are provided in the special construction of the car, which affords convenient compartments for stowing tools and parts of the derrick as concomitants of structural provisions for supporting and effecting the operation of the derrick.

Further features of improvement are found in the special construction of the boom and its connections, of the mast and its connections, and of the motor and its special connections for moving the mast, booms, loads, and car.

The further features of improvement will be found in the following description and the accompanying drawings of the invention.

In the accompanying drawings, Figure 1 represents a side view of a derrick-car embodying improvements of my invention. Fig 2 is a side view of the outer end of the main boom and its connections. Fig. 3 is a sectional view taken on the line 3 3 of Fig. 1. Fig. 4 is a plan view of the car and A-frame mast having the cross-head thereon. Fig. 5 is an end view showing the framing of the cab. Fig. 6 is a front view of the A-frame mast and parts connected therewith. Fig. 7 is a side view, and Fig. 8 is an end view, of the truck and the end of the strut for raising and lowering the mast. Fig. 9 is a front view, partially in section, taken on the line 9 9 of Fig. 10, showing in detail the construction of the mast. Fig. 10 is a top plan view, partially in section, taken on the line 10 10 of Fig. 9, showing in detail the construction of the mast. Fig. 11 is a side view of broken sections, showing in detail the construction of the mast. Fig. 12 is a sectional view taken on the line 12 12 of Fig. 9. Fig. 13 is a sectional view taken on the line 13 13 of Fig. 9. Fig. 14 is a side view of the bearings connected to the car-bolster for supporting the lateral booms and counterbalancing beams. Fig. 15 is an end view of the lower bearing, shown in Fig. 14. Fig. 16 is a plan, and Fig. 17 is a side, view of the outer end of the main boom. Fig. 18 is a plan, and Fig. 19 is a side, view of the inner end of the main boom. Fig. 20 is a sectional view taken on the line 20 20 of Fig. 17. Fig. 21 is a sectional view taken on the line 21 21 of Fig. 16. Fig. 22 is a sectional view through the splice in the main boom, taken on the line 22 22 of Fig. 16. Fig. 23 is a plan view of the bails and an end view of the main boom to which they are coupled. Fig. 24 is a front view, partially in section, showing a bail connected with the top of the mast. Fig. 25 is a side, and Fig. 26 is a front, view of a swiveled tackle-block carried by the mast. Fig. 27 is a plan view of a compound trunnion-pin for providing a swivel connection between the block and the mast. Fig. 28 represents a side elevation of the forward end of the car and the main boom supported in its lowered position. Fig. 29 is a plan, and Fig. 30 is a side, view of the bearing for connecting the main boom to the car. Fig. 31 is a side view, partially in section, of the pin by which the main-boom bearing is pivotally connected to the car. Fig. 32 is a plan view of the forward end of the car. Fig. 33 is a sectional view taken on the line 33 33 of Fig. 32. Fig. 34 is a sectional view taken on the lines 34 34 of Fig. 32. Fig. 35 is a sectional view taken on the lines 35 35 of Fig. 32. Fig. 36 is a plan view of a hoisting-engine for operating the car and derrick. Fig. 37 is a vertical sectional view of two drums that may be used in place of a main drum and the auxiliary drum shown in Fig. 36. Fig. 38 represents a side view of a drum and ratchet mechanism, shown in section in Fig. 37. Fig. 39 is a sectional view taken on the line 39 39 of Fig. 40, showing mechanism operated by the hoisting-engine for propelling the car. Fig. 40 is a side view, and Fig. 41 is a sectional view illustrating the mechanism for propelling the car. Fig. 42 represents a plan view, and Fig. 43 represents a side elevation, of the lever mechanism for operating the clutches; and Fig. 44 is a diagrammatic plan view, and Fig. 45 is a diagrammatic side view, of the mechanism for operating the truck for raising and lowering the mast.

As shown in the drawings Figs. 1, 3, 4, 32, 33, 34, and 35, the car-trucks 1 carry the sills 2, having the deep intermediate sections $2^a$ and the reduced end sections $2^b$. The center sills are connected together by the top plate 3 and bracing members 4 and 5 and to the side sills by the members 6 and 7. The bottoms of the intermediate sill-sections have fastened thereto plates forming a floor 8, which combines with the plates 7 to provide compartments 9 for holding tools. These compartments communicate with the tool-compartments 10 of the tool-box superstructures comprising the walls 11 and the doors 12 and 13. The plate 3, the walls 11, and the cover 14 thereon form a chamber 15, in which the main boom 16 may be placed when desired.

Rails 17 are fixed on the superstructure to provide a track for a truck 18, which is controlled by cables 19, passing over the sheaves 20, the truck being fixed to the track in any position desired by passing bolts 21 therethrough and through the rails, Figs. 8, 44, and 45.

The bolster 22 comprises the transverse web-plates $22^a$, connecting the center sills, and $22^b$, connecting the sills on either side of the center, and the cover-plates $22^c$, the several parts being connected together, as shown, by angles $22^d$, $22^e$, $22^{e'}$, and $22^{e''}$.

A bearing 23, having the lug $23^a$ thereon, is pivotally connected to the bolster by the pin 24 passing therethrough. The pin is held in place by the cotter 26, having the lugs $26^a$ thereon for engaging its seat $24^a$ in the pin and the spring $26^b$ for holding it in place. The lug $23^a$ receives the bifurcated inner end of the boom 16, whose lugs $16^a$ are pivotally connected thereto by the pin 25 passing therethrough. When the boom is lowered to the horizontal position, where it may be supported at its outer end by the bent 26', the pin 24 can be drawn readily and the bearing 23 held rigidly to the boom by passing a pin through the holes $23^b$ therein and $16^b$ in the boom. If now the car be moved forward, the boom will pass into the chamber 15 for stowing it, the rollers $16^c$ and $16^d$ on the boom carrying it smoothly into the chamber, Figs. 3, 18, 28, 30, and 31.

The boom structure is peculiar in character, having an intermediate part of uniform cross-section and ends of irregular cross-section tapering in form. The box construction employed for taking up the compression and bending strains is formed by the use in the middle section of ordinary regular channels $16^e$, connected together by plates $16^f$, riveted to the flanges thereof, and by the use in the end sections of tapered channels $16^g$, connected together by the tapered plates $16^h$, riveted thereto, the channels $16^g$ being pressed steel shapes. The splice between the middle and end sections is made by staggering the joints between the channels $16^e$ and $16^g$ on either side of the boom and leaving spaces $16^i$ between the plates $16^f$ and $16^h$, through which to work inside of the boom in riveting or bolting the inner splice-plates $16^j$ and the outer splice-channels $16^k$, the openings being subsequently closed by riveting or bolting splice-plates $16^l$ to the flanges of the channels. The upper face of the boom has placed between the channel-flanges the filling-piece $16^m$, of wood, to provide a smooth upper surface and prevent wear on the tackle-lines. The outer section is provided with the shackles $16^n$ for handling the boom, and the end carries the tackle-sheaves $16^o$ and $16^{o'}$, mounted on the pin $16^p$, projecting on either side of the boom, Figs. 16 to 23.

Angles 27 are fixed to the bolster 22, and the outer angles thereof are reinforced by the plates $28^a$ of the bearings 28 to provide bearings for the A-frame mast 29, embracing the feet $29^a$ on the legs $29^b$ thereof, pins 30 passing through the bearings and feet to pivotally connect them together, Figs. 10 to 15.

The feet of the mast have forwardly-projecting toes $29^c$, through which and the bolster 22 pins $29^d$ may be passed to hold the frame in the vertical position, the pins being disengaged when it is desired to use the frame in a lower position or to fold it down.

The A-frame, of box construction, has its legs $29^b$ connected by the head $29^e$ and the struts $29^f$. The legs are composed of channels $29^g$, having plates $29^h$ and gussets $29^i$ riveted to the flanges thereof, the gussets having inwardly-projecting flanges for connecting the struts $29^f$. The head comprises the bent channels $29^j$ and $29^k$, respectively, reinforced by plates $29^l$ and $29^m$, the channels being connected by the plates $29^n$, riveted to the flanges thereof and braced by the struts $29^o$ and $29^p$. The joints formed by the abutting-channels of the legs and head are staggered, and open sections $29^q$ are left between the cover-plates to permit access to the interior for riveting channel splice-plates $29^r$ and channels or bent plates $29^s$, the openings being thereafter closed by plates riveted to the channel-flanges. Beams 30', pinned to the head of the A-frame, provide a cross-head which may be supported on either side by struts 31, connected thereto by pins 32 and to bearings 33 by pins 34, the bearings being fixed to the legs of the frame. Bearings 35, fixed to the cross-head, have pin connections 36, with back legs 37, connected by bolts 38 to the angles 39, fixed to the side sills, Figs. 1, 4, and 8.

The eye-plates 40, fixed in the ends of the cross-head, are respectively adapted for carrying a link 41, which supports a tackle-block 42 for carrying a line 43, which moves a tackle-block 44, the latter being connected by a link 45 and a bail 46 with a pin 47, passing through a lateral boom 48. The pin 47 carries a bail 49 and a link 50, which support a tackle-block 51, connected with a tackle-block 52 by a line 53. The boom 48 is pivoted on a pin 54, passing therethrough and through the flanges of one of the bearings 55, which are held on the bearings 28 by pins 56. The bearings 28 are respectively adapted for engaging a counter-beam 57, connected thereto by a pin 58 and supported at its outer end by a pin connection 59 with the tie-rod 60, having a pin connection 61 with the crosshead. A weight 62 may be connected to the outer end of the counter-beam in lieu of an anchorage to balance the load handled by the lateral boom 48. It is to be understood that this mechanism contemplates the use of a lateral derrick on each side of the car at the same time when desired.

The top of the A-frame carries a pin 63, which passes through a gooseneck 64 for the engagement of guy-rods 65, anchored to bars 66, fastened to side sills on either side of the cab 67, the guy-rods being composed of links which permit them to fold together on lowering the A-frame, Figs. 1, 3, and 4.

A swivel-block 68 is sleeved on the pin 63 and is provided with trunnions 68$^a$, which engage the bail 69, having its members 69$^a$ bent inward and braced by a spreader 69$^b$. The bail is connected by a pin 70 with the topping fall-block 71, which carries the line 72 for moving the block 73. The latter is connected by a pin 74 with the bail 75, engaged by the pin 16$^p$ in the end of the main boom, the members 75$^a$ of the bail being drawn together and braced by the spreader 75$^b$. The pin 16$^p$ also carries the bail 76, having its parallel members 76$^a$ drawn together and united to form a shackle 76$^b$, the whole being forged in an integral piece and the shackle being braced by a spreader 76$^c$, Figs. 1, 2, 6, 23, and 24. A link 77, carried by the bail 76, supports a block 78, which carries the line 79 for moving the block 80 of the lifting-tackle formed thereby. A tackle-block 81 carries the lines 72 and 79. This block has its cheek-piece lugs 81$^a$ connected to trunnions 82$^a$ of a compound trunnion or swivel pin 82, the swivel-pin having trunnions 82$^b$, journaled in bearings 8, which are connected by bolts 84 with a strut 29$^f$. The swivel-pin is forged in a single piece with trunnions at right angles to each other to permit the block to oscillate freely upon either axis. It will be seen that this block and its bearings can readily be detached by removing the bolts 84 and the block and bearings can be readily fixed together for convenience in handling by passing a pin through the holes 81$^b$ of the block-lugs and 83$^b$ of the bearings, Figs 1, 25, 26, and 27.

Bearings 85, fixed to the A-frame, have pin connections 86 with the strut 87, which is connected by pins 88 with the truck 18, the A-frame being supported and adjusted thereby. The lines 19 connect the truck-clevises 18$^a$ and the block 89, which runs in channels 90, fixed on either side of the chamber 15. This block being moved by a line 91, which is fixed to the movable block 89, passes around the sheave 89$^a$ thereof and 92$^a$ of the stationary block 92 and thence to a drum of the hoisting-engine, Figs. 1, 3, 7, 8, 44, and 45.

The engine is carried on the I-beams 93, which rest on a cab-floor extended laterally beyond the side sills for providing additional room. The engine being a modification of a usual type of hoisting-engine has the drums 94 and 95 suitable for operating the topping fall and load lines for the main boom and the spools 96 and 97 on either side for operating the topping fall and load lines of the auxiliary booms. To operate the truck for the A-frame, there may be connected to the usual engine an auxiliary drum 98 for controlling the line 91, which operates the block 89.

The drum 98 is sleeved to rotate on the shaft 99, journaled in bearings 100 and driven from the shaft 101, carrying the drum 94, the shaft 99 having a sprocket 102 fixed thereon, which is connected with the sprocket 103, fixed on the shaft 101 by a chain 104, Fig. 36. To fix the drum 98 to the shaft 99, the friction-clutch 105 is fixed on the shaft and the drum is moved to throw its corresponding clutch 98$^a$ into engagement therewith. To shift the drum, a rod 106 moves longitudinally in the shaft 99, having a pin 107, which engages the drum and reciprocates in the slot 108 of the shaft. To reciprocate the rod 106, a fulcrumed lever 109 engages a reduced portion 106$^a$ thereof, journaled in the lever.

In the construction of the engine I may substitute the mechanism shown in Figs. 37 and 38 for the drum 94. In this case the shaft 101 carries the drums 110 and 111. The drum 110 is loose on the shaft and is engaged therewith by providing it with a frictional clutching member 110$^a$, which may be thrust into engagement with a corresponding clutching member 112$^a$, carried by the spur-wheel 112, fixed to the shaft, the drum being automatically unclutched in any usual manner, as by the thrust of a spring 113. The speed of rotation of the drum may be regulated by the usual brake-band 114, operating on the cylindrical surface 110$^b$, and the drum may be held stationary by engaging the usual ratchet-wheel 110$^c$, fixed thereto. The drum 111 is mounted to rotate freely and to be held against longitudinal movement on a sleeve 115, splined on the shaft 101, so that it may be moved longitudinally and held against rotation thereon. On the sleeve is keyed a ratchet-wheel 116, to which the drum 111 may be engaged by a pawl 111ª thereon. The ratchet-wheel carries a collar 116ª, which may be engaged by a lever for moving the wheel, the drum, and the sleeve longitudinally on the shaft 110, the movement of the sleeve against the hub of the drum 110 causing it to be clutched to the wheel 112. The speed of the drum 111 is regulated by the usual brake-band 117, which operates on the cylindrical surface 111ᵇ thereof.

The spur-wheels 112 and 118 are engaged and driven by the pinion 119 on the journaled shaft 119′ through the usual crank 120 thereon and driving-rod 121. Engaging with the spur-wheel 112 is a pinion 122, which meshes with a pinion 123, fixed on the journaled shaft 124, the shaft having a pinion 125 fixed thereon, Figs. 40 and 41. The spur-wheel 112 also engages the pinion 126, which engages a pinion 127, loose on a revoluble shaft 128, having a pinion 129 fixed thereon, the pinion 129 engaging a pinion 130, fixed on a journaled shaft 133, having the spur-wheel 131 and the sprocket 132 fixed thereon. The spur-wheel 131 meshes with a spur-wheel 134, fixed on a journaled shaft 135, having the spur-wheel 136 loose thereon. The sprocket-wheel 132 is connected by the sprocket-chain 137 with the sprocket-wheel 138, fixed on the truck-axle 139, through which the car is propelled. The shaft 133 is journaled in hangers 140, fulcrumed on the bearings 141, and the hangers are moved to tighten or loosen the chain 137 by a link 142, pivoted thereto and to a lever 143, having the journal 144, Figs. 39, 40, and 41.

To propel the car in the rearward direction, the clutch 145 on the shaft 135 is operated to engage the pinion 136 to the shaft when the sheave 132 is revolved by the spur-wheel 112 acting through the pinions 122, 123, 125, 136, 134, and 131 and to propel the car forward the clutch 146 on the shaft 128 is operated to engage the pinion 127 to its shaft when the sheave is revolved in the opposite direction by the spur-wheel 112 acting through the pinions 126, 127, 129, and 130.

To operate the clutches of well-known type their respective collars 145ª and 146ª are moved on the respective shafts 135 and 128 by levers 147 and 148, engaged therewith and having the fulcrums 149 and 150. These levers are connected together by a rod 151 and operated by a crank 152, thrown by a rod 153 and a lever 154.

It will now be understood that the car, with the derrick thereon, can be moved from place to place by the motor that elevates and lowers the mast and operates the tackles for moving the three booms and the loads lifted thereby. The truck and strut connected with the mast can be moved to and held at the position desired, whether for fully elevating or lowering it or holding it at such inclined position as may be required for passing under a bridge or lifting with a lowered top. The main and lateral booms, which are stowed on the car and readily assembled or dissociated by reason of their bearings and pin connections, can be simultaneously operated, if desired, and admit of operations about the car throughout the greater part of the arc of a circle. The peculiar construction of the mast affords great strength and stiffness and, with the cross-head and the members that support it, provides a stable structure for lifting and balancing heavy loads regardless of their positions. The peculiar construction of the car-bolster is required for supporting the mast, the booms, and the beams, and the construction of the body, while affording the necessary strength and space, provides advantageous means for stowing the apparatus. The method of splicing the parts joined in the mast and in the main boom permits the production of the solid box construction required for providing practically uniform strength, avoiding the weakness that usually obtains where access to the interior must be had for connecting splicing members. The strut for use as the main boom has peculiar advantages by reason of its construction and shape, providing the necessary resistance to compression and bending strains and affording facility for making connections therewith, and it is to be understood that a like construction and shape may be employed for a mast or other use suitable therefor. It will be understood that the construction of this strut permits the insertion or removal of sections for regulating the length very readily, since the splice that is used gives the strength of a jointless construction that is otherwise required to obtain the desired resistance to strains, and with the splice either one or several intermediate sections may be employed.

Having described my invention, I claim—

1. In apparatus of the class described, a car, a mast having its foot fulcrumed on the body of said car, a boom having its foot fulcrumed in relation to said car, a strut having a fulcrumed connection to said mast and a movable foot, and means on said car for controlling the movable foot of said strut to lower said mast, substantially as specified.

2. In apparatus of the class described, a car, a track thereon, a truck movable on said track, a mast having its lower end fulcrumed on said car, a strut fulcrumed to said mast and supported by said truck, and a boom connected to said mast and having its foot fulcrumed in relation thereto, substantially as specified.

3. In apparatus of the class described, a car, a track thereon, a truck on said track, a pin passing through a member of said truck and a rail of said track, an A-frame mast having its feet fulcrumed on said car, a strut fulcrumed to said truck and mast, and a boom connected to said mast and fulcrumed in relation thereto, substantially as specified.

4. In apparatus of the class described, a car, an A-frame mast having its feet fulcrumed on said car, a movable truck, a strut having fulcrumed connections to said mast and truck, folding guy-rods connecting the top of said mast with opposite sides of said car, and a boom connected to said mast, substantially as specified.

5. In apparatus of the class described, an A-frame having a box construction comprising a pair of channels having staggered ends, cover-plates secured to the flanges of said channels and having ends staggered with reference to the ends of said channels, a second pair of channels having staggered ends registering with said first channel ends, cover-plates secured to the flanges of said second pair of channels, a space or spaces between said first and last named cover-plates, splicing members secured to said channels interior and exterior thereto, and a cover plate or plates secured to said flanges over said aperture or apertures, substantially as specified.

6. In apparatus of the class described, an A-frame having legs comprising channels, cover-plates secured to the flanges of said channels, a head comprising bent channels registering with said first channels and forming staggered joints therewith, cover-plates for said head-channels, an aperture between said cover-plates for access to the interior of said joints, splice-plates for said joints within said structure, and a cover-plate for said aperture, substantially as specified.

7. In apparatus of the class described, an A-frame having legs comprising webs with flanges thereon, cover and gusset plates secured to said flanges, a head comprising a reinforced web with flanges thereon and cover-plates connected with said last-named flanges, and struts connecting said gusset-plates, substantially as specified.

8. In apparatus of the class described, an A-frame having horizontal and vertical apertures through the feet thereof, pins passing through said apertures, bearings having apertures through which said pins pass, and means for supporting said frame independently of the pins passing vertically through said feet and bearings, substantially as specified.

9. In apparatus of the class described, a car-bolster, a bearing, a pin by which said bearing is fulcrumed on said bolster, a boom fulcrumed on said bearing, a bearing secured to an end of said bolster, a boom fulcrumed on said bearing, and a mast to which each of said booms is connected, substantially as specified.

10. In apparatus of the class described, a car-bolster, bearings at each end of said bolster, a boom adapted to be fulcrumed on a bearing at one end of said bolster, a counter-beam adapted to be fulcrumed on a bearing at the other end of said bolster, and a mast adapted to be connected with said boom and counter-beam, substantially as specified.

11. In apparatus of the class described, a bolster, a counter-beam bearing connected with said bolster at each end thereof, and a boom-bearing having a pin connection with each of said counter-beam bearings, substantially as specified.

12. In apparatus of the class described, a mast, a bearing for the foot of said mast, a pin connecting said mast and foot, a second bearing engaged by said pin, and a beam fulcrumed on said second bearing, substantially as specified.

13. In apparatus of the class described, a mast, bearings for the feet of said mast, pins connecting said bearings and feet, bearings supported by said pins adapted for fulcruming a beam, bearings supported by said second bearings adapted for fulcruming a boom, and pins for fulcruming said last-named bearings to said second bearings, substantially as specified.

14. In apparatus of the class described, a car having a set of sills and a superstructure carried by said sills, said superstructure comprising tool-compartments and a longitudinal boom-chamber between said compartments, substantially as specified.

15. In apparatus of the class described, a car having a set of sills, a superstructure comprising a longitudinal chamber, and a boom which said chamber is adapted to receive, substantially as specified.

16. In apparatus of the class described, a car, a track carried thereby, a truck movable on said track, a second track carried by said car, a block movable on said last-named track and connected with said truck, and a block connected with said movable block, substantially as specified.

17. In apparatus of the class described, a car, a track carried thereby, a truck movable on said track, a strut supported by said truck, a second track carried by said car, a block connected with said truck and movable on said second track, a motor carried by said car, and a block and line connecting said motor with said first block, substantially as specified.

18. In apparatus of the class described, a car, a mast having a fulcrum connection with said car, a main boom having a fulcrum connection with said car, a pair of auxiliary booms having fulcrum connections with said car, tackle mechanisms for operating independently each of said booms and their respective loads, and a motor having separate mechanisms for operating each of said tackle mechanisms independently, substantially as specified.

19. In apparatus of the class described, a truck, a movable block connected with said truck, a track on which said block runs, a stationary block, a drum, and a line connecting said drum with said blocks, substantially as specified.

20. In apparatus of the class described, a car, a derrick thereon, an engine connected with and operating said derrick, a wheel connected with an axle of said car, a train of gears and a clutch mechanism for connecting said engine and wheel for moving said car in one direction, and a separate train of gears and clutch mechanism for connecting said engine and wheel and moving said car in the opposite direction, substantially as specified.

21. In apparatus of the class described, a car, a derrick thereon, a motor connected with and operating said derrick, a sprocket-wheel connected with an axle of said car, a journaled shaft and a sprocket-wheel thereon, a chain connecting said sprocket-wheels, a pair of pinions on said shaft, two trains of gears for connecting said motor with said pinions, said gear-trains driving in opposite directions, and clutching mechanism for disengaging either gear-train while engaging the other, substantially as specified.

22. In apparatus of the class described, a car, a mast supported by said car, a main boom connected with said mast and supported by said car, and a lateral boom connected with said mast and having means connecting it with said car whereby it is adapted to move vertically and horizontally on the side thereof, substantially as specified.

23. In apparatus of the class described, a car, a mast comprising connected upright members fulcrumed in relation to said car, a main boom fulcrumed in relation to said car, a lateral boom fulcrumed in relation to said car, and means for counterbalancing said lateral boom, substantially as specified.

24. In apparatus of the class described, a car, a mast comprising a plurality of connected upright members fulcrumed in relation to said car, a strut for supporting said mast, a main boom fulcrumed in relation to said car, a lateral boom fulcrumed in relation to said car, and means for counterbalancing said lateral boom, substantially as specified.

In testimony whereof I have hereunto set my hand, this 26th day of October, A. D. 1904, in the presence of the subscribing witnesses.

SAMUEL P. MITCHELL.

In presence of—
 THOMAS S. GATES,
 UTLEY E. CRANE, Jr.